(12) United States Patent
Krishnamoorthy et al.

(10) Patent No.: US 9,329,660 B2
(45) Date of Patent: *May 3, 2016

(54) LOWEST POWER MODE FOR A MOBILE DRIVE

(71) Applicant: Marvell World Trade Ltd., St. Michael (BB)

(72) Inventors: Ravishanker Krishnamoorthy, Chiltren Park (SG); Yun Yang, Los Altos, CA (US); Abdul Elaydi, Santa Clara, CA (US)

(73) Assignee: Marvell World Trade Ltd. (BB)

( * ) Notice: Subject to any disclaimer, the term of this patent is extended or adjusted under 35 U.S.C. 154(b) by 215 days.

This patent is subject to a terminal disclaimer.

(21) Appl. No.: 14/076,872

(22) Filed: Nov. 11, 2013

(65) Prior Publication Data
US 2014/0075229 A1   Mar. 13, 2014

Related U.S. Application Data

(63) Continuation of application No. 12/240,487, filed on Sep. 29, 2008, now Pat. No. 8,582,227, which is a continuation of application No. 11/699,138, filed on Jan. 26, 2007, now Pat. No. 7,443,627.

(60) Provisional application No. 60/779,975, filed on Mar. 7, 2006, provisional application No. 60/783,944, filed on Mar. 20, 2006.

(51) Int. Cl.
*G11B 15/18* (2006.01)
*G06F 1/32* (2006.01)
(Continued)

(52) U.S. Cl.
CPC ............ *G06F 1/3234* (2013.01); *G06F 1/3203* (2013.01); *G06F 1/3206* (2013.01); *G11B 25/043* (2013.01); *G11B 33/121* (2013.01)

(58) Field of Classification Search
CPC .... G06F 1/3234; G06F 1/3203; G06F 1/3206
See application file for complete search history.

(56) References Cited

U.S. PATENT DOCUMENTS 4,776,023 A   10/1988   Hamada et al.
4,817,179 A   3/1989   Buck
(Continued)

FOREIGN PATENT DOCUMENTS

JP          2004-22823 A     1/2004
KR   10-2005-0038650 A       4/2005
(Continued)

OTHER PUBLICATIONS

State Intellectual Property Office of the People's Republic of China; Translation of First Offie Action; Application No. 200780008171.7; dated Jun. 10, 2010, pp. 1-9.
(Continued)

*Primary Examiner* — Fred Tzeng

(57) ABSTRACT

A hard disk drive enters a low power mode to reduce power consumption. To maintain communication with a host device, a communication interface remains energized along with a circuit portion storing configuration data for the communication interface. To energize the communication interface and the circuit portion, low power voltage regulators provide suitable reference voltages. One low power voltage regulator is dedicated to this purpose. Another voltage regulator is converted from an active, switching mode to a low power, linear mode to provide the necessary reference voltage. Also, unique handshaking signals are used to control entry and exit from the low power mode by the hard disk drive.

20 Claims, 7 Drawing Sheets

(51) Int. Cl.
*G11B 25/04* (2006.01)
*G11B 33/12* (2006.01)

(56) References Cited

U.S. PATENT DOCUMENTS

| | | | |
|---|---|---|---|
| 5,005,139 | A | 4/1991 | Tung |
| 5,073,952 | A | 12/1991 | Watanabe |
| 5,235,650 | A | 8/1993 | Jeong |
| 5,345,347 | A | 9/1994 | Hopkins et al. |
| 5,630,026 | A | 5/1997 | Ogletree et al. |
| 5,954,820 | A | 9/1999 | Hetzler |
| 6,129,457 | A | 10/2000 | Thompson, Jr. et al. |
| 6,320,977 | B1 | 11/2001 | Tokura |
| 6,601,180 | B1 | 7/2003 | Paredes et al. |
| 6,725,385 | B1 | 4/2004 | Chu et al. |
| 6,819,452 | B1 | 11/2004 | Richtsmeier et al. |
| 7,251,061 | B2 | 7/2007 | Larson et al. |
| 2005/0010831 | A1 | 1/2005 | Bashford et al. |
| 2005/0273663 | A1 | 12/2005 | Yoon |
| 2005/0289262 | A1 | 12/2005 | Sutardja |
| 2006/0072231 | A1 | 4/2006 | Fischer |
| 2007/0004436 | A1 | 1/2007 | Stirbu |
| 2007/0104042 | A1 | 5/2007 | Sugahara et al. |
| 2007/0264954 | A1 | 11/2007 | Qi et al. |
| 2007/0264955 | A1 | 11/2007 | Tsai et al. |

FOREIGN PATENT DOCUMENTS

| | | |
|---|---|---|
| TW | 200529187 A | 9/2005 |
| WO | WO 2004/023279 A2 | 3/2004 |

OTHER PUBLICATIONS

Office Action mailed Jan. 16, 2013 for Taiwanese Patent Application No. 096107934, including English Translation of the Text of the First Office Action.
First Office Action in corresponding Korean Application No. 10-2008-7024555, and English translation thereof, Transmittal No. 9-5-2013-052074918, dated Jul. 29, 2013, 10 pages.

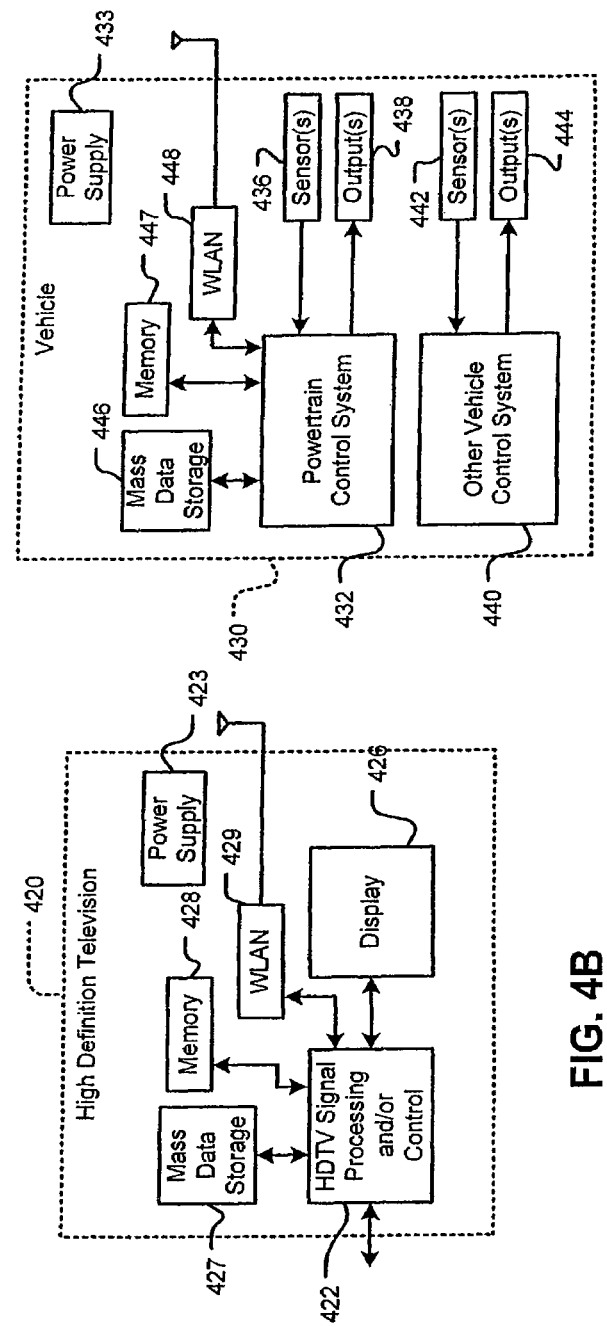

LOWEST POWER MODE FOR A MOBILE DRIVE

CROSS-REFERENCE TO RELATED APPLICATION

The present application is a continuation of U.S. Non-Provisional application Ser. No. 12/240,487, filed Sep. 29, 2008 (now U.S. Pat. No. 8,582,227), which is a continuation application of U.S. Non-Provisional application Ser. No. 11/699,138, filed Jan. 26, 2007 (now U.S. Pat. No. 7,443,627), which claims the benefit of U.S. Provisional Application No. 60/783,944, filed Mar. 20, 2006, and U.S. Provisional Application No. 60/779,975, filed Mar. 7, 2006. The contents of U.S. Non-Provisional application Ser. No. 12/240,487 (now U.S. Pat. No. 8,582,227), U.S. Non-Provisional application Ser. No. 11/699,138 (now U.S. Pat. No. 7,443,627), U.S. Provisional Application No. 60/783,944, and U.S. Provisional Application No. 60/779,975 are hereby incorporated by reference in their entirety.

BACKGROUND

The present invention relates generally to data storage devices. More particularly, the present invention relates to reducing power consumption in a hard disk drive system, particularly for applications with low-power portable devices.

Host devices such as computers, laptop computers, personal video recorders (PVRs), MP3 players, game consoles, servers, set-top boxes, digital cameras, and other electronic devices often need to store a large amount of data with fast read and write times. Storage devices such as hard disk drives (HDD) may be used to meet these storage requirements.

Referring now to FIG. 1, an exemplary hard disk drive (HDD) 100 is shown to include a hard disk drive (HDD) system on chip (SOC) 102 and a hard drive assembly (HDA) 104. The HDD 100 communicates with a host device 120. It is a design goal to provide as high a speed as possible for writing to and reading from the HDD 100. Maximizing reading and writing speed includes maximizing data transfer rates between the host device 120 and the HDD 100 and reducing the amount of time the host device 120 has to wait for a response from the HDD 100. Wait time or latency can occur while stored data is being retrieved or while the HDD 100 is being activated again from inactivity.

The HDA 104 conventionally includes one or more hard drive platters for storing data. A spindle motor rotates the hard drive platters. Generally the spindle motor rotates the hard drive platters at a fixed speed during read and write operations. One or more read/write actuator arms move relative to the hard drive platters to read and or write data to or from the hard drive platters.

A read/write device is located near an end of the read/write arm. The read/write device includes a write element such as an inductor that generates a magnetic field. The read/write device also includes a read element (such as a magneto-resistive (MR) element) that senses the magnetic field on the platters. A preamp circuit amplifies analog read/write signals.

When reading data, the preamp circuit amplifies low level signals from the read element and outputs the amplified signal to a read/write channel device. When writing data, a write current is generated which flows through the write element of the read/write device. The write current is switched to produce a magnetic field having a positive or negative polarity. The positive or negative polarity is stored by the hard drive platters and is used to represent data.

The HDD SOC 102 typically includes a buffer 106 that stores data that is associated with the control of HDD 100 and/or buffers data to allow data to be collected and transmitted as larger data blocks to improve efficiency. The buffer 106 may employ DRAM, SDRAM or other types of low latency memory. The HDD SOC 102 further includes a processor 108 that performs processing that is related to the operation of the HDD 100.

The HDD SOC 102 further includes a hard disk controller (HDC) 110 that communicates with a host device 120 via an input/output (I/O) interface 112. The HDC 110 also communicates with a spindle/voice coil motor (VCM) driver 114 and/or the read/write channel device 116. The I/O interface 112 can be a serial or parallel interface, such as an Integrated Drive Electronics (IDE), Advanced Technology Attachment (ATA), or serial ATA (SATA) interface. The spindle/VCM driver 114 controls the spindle motor which rotates the platters. The spindle/VCM driver 114 also generates control signals that position the read/write arm, for example using a voice coil actuator, a stepper motor or any other suitable actuator.

The I/O interface 112 of the HDD 100 communicates with an I/O interface 122 that is associated with the host device 120. The data communication may be in accordance with any suitable standard. In one example, the two I/O interfaces 112, 122 implement the Universal Serial (USB) Bus standard.

Particularly in applications in which the host device 120 is portable, low power operation is particularly desirable. The host device 120 includes a battery 124 that provides operating power to the host. In some cases, the battery 124 also provides operating power to the HDD 100, for example, over the USB connection between the two I/O interfaces 112, 122. The battery 124 may be recharged if depleted.

To extend the operating life of the battery 124, it is desirable to minimize or eliminate power consumption of components such as the HDD 100. Thus, when the HDD 100 is not required for reading or writing data, the HDD 100 may enter a low power mode in which active circuits are deactivated. However, when exiting the low power mode and becoming active again, the process of reactivating these circuits can produce a latency or wait time during which the host device 120 is waiting for a response. It would be desirable to provide a method and apparatus which produces the lowest power mode but which also returns to active state quickly for communication with the host device.

SUMMARY

The present invention is defined by the following claims, and nothing in this section should be taken as a limitation on those claims.

By way of introduction, the embodiments described below provide a hard disk drive. In one embodiment, the hard disk drive enters a low power mode to reduce power consumption. To maintain communication, a communication interface remains energized along with a circuit portion storing the configuration data for the communication interface. To energize the communication interface and the circuit portion, low power voltage regulators provide suitable reference voltages. One voltage regulator is relatively low in power consumption and is dedicated to this purpose. The other voltage regulator is converted from an active, switched mode to a low power, linear mode to provide the necessary reference voltage. In another embodiment, unique handshaking signals are used to control entry and exit from the low power mode by the hard disk drive. Other embodiments are provided, and each of the embodiments described herein can be used alone or in combination with one another.

Exemplary embodiments will now be described with reference to the attached drawings.

BRIEF DESCRIPTION OF THE DRAWINGS

FIG. 4B is a functional block diagram of a high definition television;
FIG. 4C is a functional block diagram of a vehicle control system.

DETAILED DESCRIPTION OF THE PRESENTLY PREFERRED EMBODIMENTS

Figure 1:
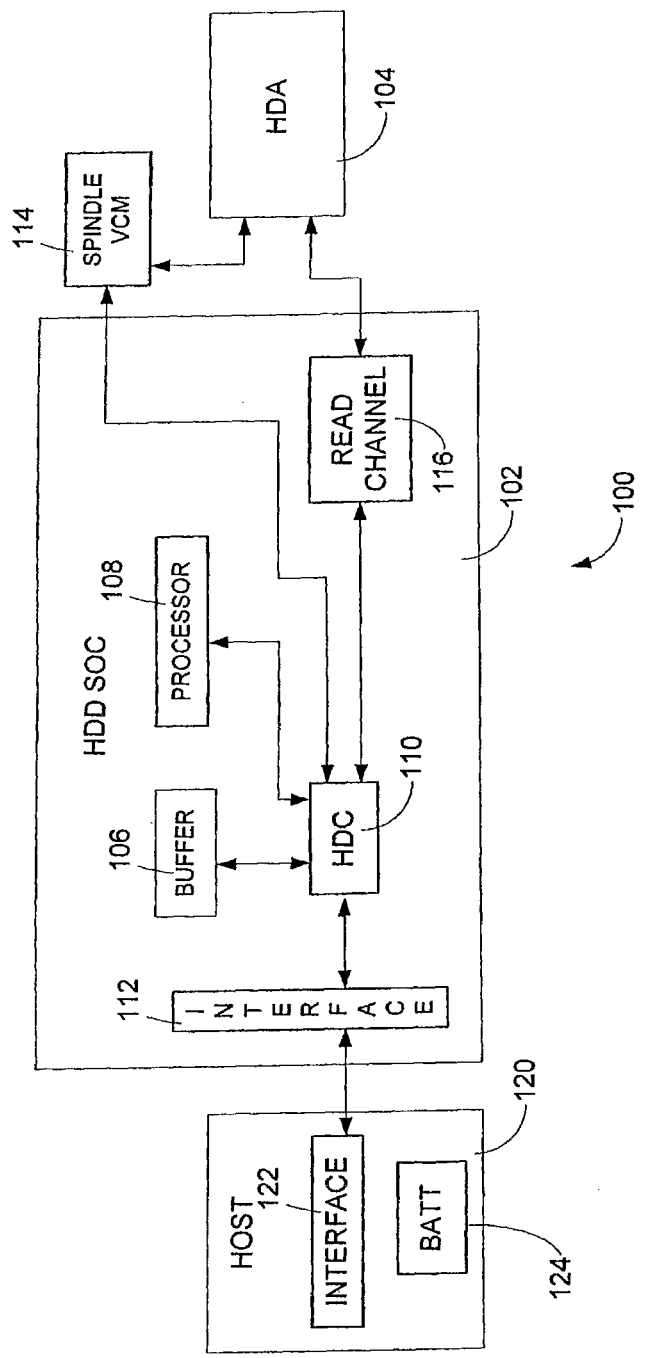
FIG. 1 is a block diagram of a prior art hard disk drive.
Figure 2:
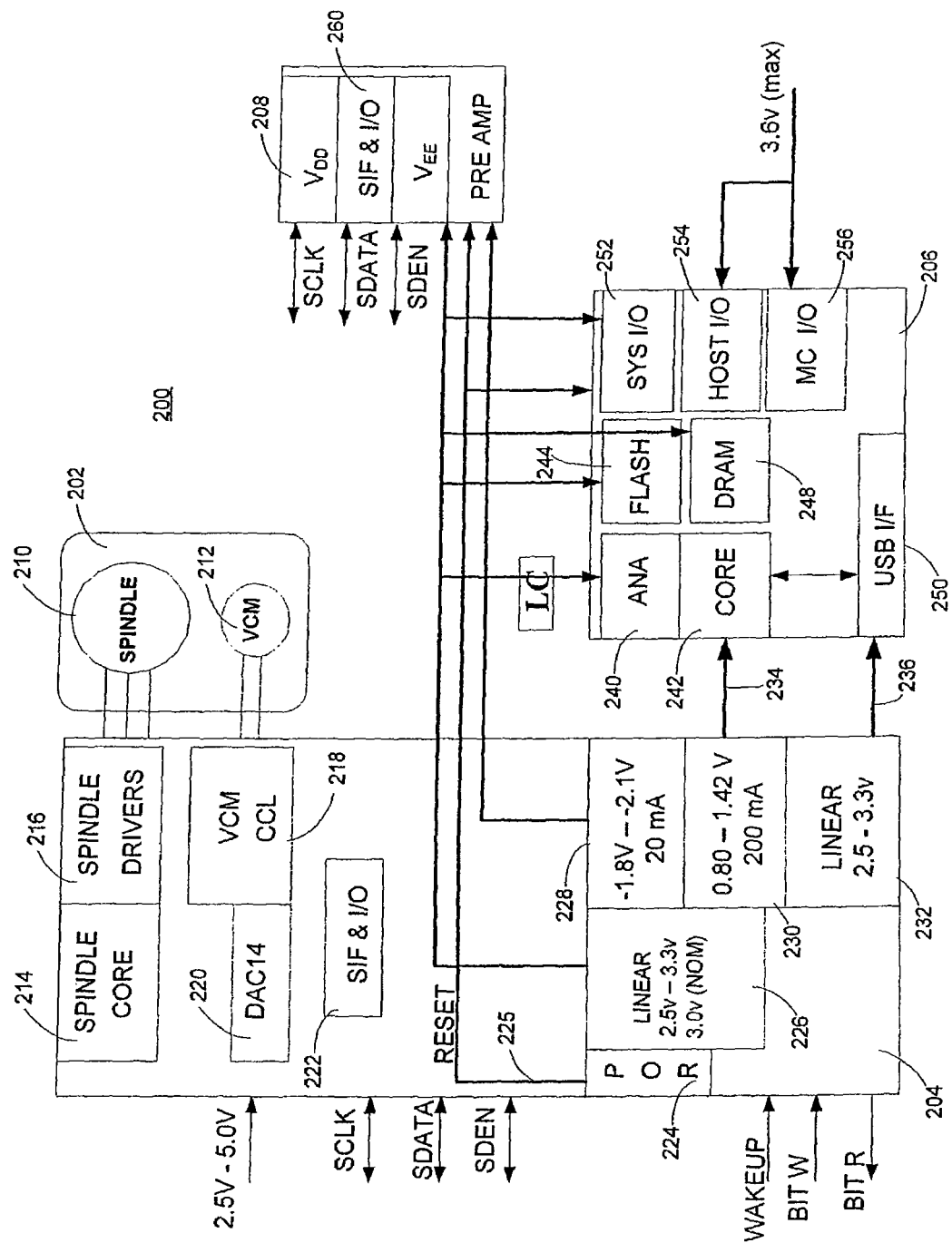
FIG. 2 is a block diagram of a hard disk drive.

Referring to FIG. 2, it shows a block diagram of a hard disk drive (HDD) 200. The HDD 200 includes a hard drive assembly (HDA) 202, a motor controller (MC) 204, a system on a chip (SoC) 206 and pre-amplifier 208. In exemplary embodiments, the HDD 200 may be incorporated with portable devices such as computers, laptop computers, personal video recorders (PVRs), MP3 players, game consoles, and digital cameras. These and other electronic devices often need to store a large amount of data with fast read and write times. Portable devices are generally powered by a battery, so low power consumption is essential to prolonged battery life.

The HDA 202 includes a spindle motor 210 and a voice coil motor (VCM) 212 and storage media such as one or more hard disk platters coated with a magnetic media. The spindle motor 210 turns the disk platters at a predetermined speed. The VCM 212 is an actuator that controls the positioning of the read and write heads relative to the spinning platters. The HDA 202 may be conventional. In one exemplary embodiment, the HDA 202 has a very small form factor, e.g., size 0.85 to 1.0 inch, for use with portable electronic devices.

The MC 204 includes a spindle core 214, spindle drivers 216, a voice coil motor coil (VCM CCL) 218, digital to analog converter (DAC) 220 and a serial interface and input/output (SIF/IO) circuit 222. The MC 204 further includes a power on reset (POR) circuit 224 and several regulators, including a 3 volt regulator 226, a −2 volt regulator 228, a 1.2 volt regulator 230 and a 3.3 volt regulator 232.

The spindle core 214 includes digital logic circuitry to control operation of the spindle motor 210. Features such as speed control and feedback are managed by the digital logic circuitry of the spindle core 214. The spindle core 214 is in communication with the spindle drivers 216, which include circuits to drive the spindle motor 210. The spindle drivers 216 may include digital logic circuits but also include circuits able to drive the current and voltage required to actuate the spindle motor 210. These current and voltage requirements may differ from current and voltage requirements or digital logic such as the spindle core 214.

The VCM CCL 218 of the MC 204 is in communication with the VCM 212 of the HDA 202. The VCM CCL 218 controls the positioning of read and write heads of the HDA 202 relative to the platters of the HDA 202. The DAC 220 converts digital data received by the MC 204 to analog signals for storage on the HDA 202. The analog signals are suitable to drive the VCM CCL 218.

The SIF/IO circuit 222 forms a data communication circuit between the MC 202 and other portions of the HDD 200, such as the SoC 204. As will be discussed in greater detail below in conjunction with FIG. 3, the SIF/IO circuit 222 implements a three conductor data communication protocol using lines or conductors labeled SCLK or serial clock, SDATA or serial data, and SDEN or serial data enable. When the signal on the SDEN line is low, serial data is provided to the SDATA line. In accordance with the disclosed communication protocol, a clock circuit is then provided by a transmitting device to clock the serial data into the receiving device. In this manner, a two-way data communication circuit is implemented using minimal connections yet providing reliable, high speed communication. The SIF/IO circuit 222 implements the communication protocol for the MC 204.

The POR circuit 224 operates to initiate portions of the MC 202 to a defined state, particularly after power is initially applied to the MC 202. The POR circuit applies a reset signal on signal path 225. Registers and other data storage components (not shown) of the spindle core 214 and the DAC 220 are reset to a zero state. Since unexpected data states can be created, particularly during the power on operation, and such unexpected data states can cause unexpected results, the POR circuit resets (for example) suitable circuits to a predetermined state.

The regulators 226, 228, 230, 232 provide operating voltages and currents for use by other components of the HDD 200. In general, each regulator is defined by its output signal. The value of the output signal may be programmed by the SoC 206 to control performance factors for the device. Thus, the 3 volt regulator 226 provides a voltage signal with a nominal value of 3 volts. As indicated in FIG. 2, this value may vary between 2.5 and 3.3 volts. Similarly, the −2 volt regulator 228 provides a signal with a nominal value of −2 volts, but this value may be varied between, for example, −1.8 and −2.1 volts. Still further, the 1.2 volt regulator 228 provides a signal with a nominal voltage of 1.2 volts but this value may be varied between 0.80 and 1.42 volts. As an example of how the SoC may program or vary output signals to control performance factors, in order improve high data rate performance, the SoC 206 program the 1.2 volt regulator 228 to produce an output a value of 1.4 volts. For another application or mode, in low data rate mode or in standby mode, the SoC 206 will program the 1.2 volt regulator 228 to produce an output value of 0.8 volts. This will save power and extend battery life in portable devices. As indicated in FIG. 2 by signal path 234, the signal from the 1.2 volt regulator 228 is provided to the SoC 206. Still further, the 3.3 volt regulator 232 provides a signal having a voltage that is nominally 3.3 volts but may vary between 2.5 volts and 3.3 volts. As indicated in FIG. 2 by signal path 236, this signal is provided to the SoC 206.

The regulators 226, 228, 230, 232 may be of any suitable design to meet the requirements of the HDD 200. In a typical application, a regulator generates a signal having a value which is generally insensitive to some other parameter, such as supply voltage or temperature, or having a value which tracks parameter variations in a known way. For example, in the illustrated embodiment, the regulator 230 provides power supply for the SoC core 242 and in this embodiment is a bandgap regulator having an output voltage of approximately 1.2 volts, or about equal to the bandgap voltage of silicon. The temperature variation of this output voltage is well known and the voltage may be used, for example, to bias current sources in other circuits.

The regulators 226, 228, 230, 232 in some implementations operate in one of a linear mode and a switching mode. In the linear mode, the regulator performs a voltage division to produce the output voltage and uses a feedback circuit to adjust an input voltage to keep the output voltage relatively constant. In the linear mode, more power is consumed in control circuits and this is dominant in large load currents. However, at low load currents, the control circuit's power consumption is relatively smaller. In the switching mode, the regulator switches load current rapidly on and off in order to keep the output voltage relatively constant. In the switching mode, more circuitry is required to operate the regulator and consequently power dissipation is greater. However, for switching mode the control circuit current is constant irrespective of the load current and the control circuit's current is significantly large at smaller load current. The control circuit's current is usually larger than the control circuit in the linear mode. Thus, for low power operation, linear mode operation is preferred, but a regulator in linear mode has an output voltage with greater variation based on the current drawn by a load. From an efficiency point of view, the best usage to maximize batter live favors switching mode at normal operations and linear mode for very small load like low power mode.

The SoC 206 includes an analog circuit 240, a SoC core 242, a flash memory 245 and a dynamic random access memory (DRAM) 246. For external communication, the SoC 206 includes a Universal Serial Bus (USB) interface 250, a system input/output (I/O) circuit 252, a host input/output (I/O) circuit 254 and a motor controller (MC) input/output (I/O) circuit 256.

The analog circuit 240 provides analog functions, such as filtering, to the SoC 206. The SoC core 242 includes digital logic to perform a variety of functions, including controlling operation of the HDD 200. For example, the SoC core 242 includes a read channel physical layer core which provides functions such as data encoding and decoding, error detection and correction for processing data received for storage on the HDA 202 or retrieved from storage on the HDA 202. The SoC core 242 may include a programmable processor which operates in response to instructions and data and which may issue instructions or commands to other circuits of the SoC 206 and MC 204. The SoC core 242 includes storage such as registers for retaining some data, although if power is interrupted to the SoC core 242, the contents of the registers may be lost or corrupted.

The SoC core 242 is powered by the 1.2 volt regulator 230 over signal path 234. That is the 1.2 volt regulator 230 provides a regulated signal over the signal path 234 to the SoC core 242.

The flash memory 244 and the DRAM 246 store data and instructions for use by other components of the HDD 200, such as the SoC core 242. The flash memory 244 is non-volatile and may be written and read by application of suitable signals. The DRAM 246 is volatile and requires periodic refreshing.

The USB interface 250 provides a two-way communication circuit from the HDD 200 to external data processing equipment, such as a host processor. The communication is in accordance with the USB communication standard. This standard provides a daisy chained architecture, with a host controller and multiple daisy chained devices. Up to 64 devices may communicate with the host processor. Each device, such as the USB interface 250, is defined by a USB identity and a USB configuration. In the SoC 206, the USB identity and USB configuration are stored in the SoC core 242. In the embodiment of FIG. 2, a signal is provided from the 3.3 volt regulator 232 on the signal path 236 to the USB interface 250.

The system I/O circuit 252, the host I/O circuit 254 and the MC I/O circuit 256 provide additional remote communications resources for the SoC 206. Communications using these ports may be by any conventional standard. They may be used in some applications or remain disconnected in other applications.

The pre-amplifier 208 is a pre-amplifier for read/write operations of the HDD 200. The pre-amplifier 208 includes a serial interface and input/output (SIF&IO) circuit 260. This circuit 260 includes an external serial interface for data transfer to and from the HDD 200. The serial interface includes three conductors or external pins labeled SDEN, SDATA and SCLK for serial data enable, serial data and serial clock, as described herein. The serial interface provided by the SIF&IO circuit 260 allows internal registers of the SoC core 242 to be programmed. As will be discussed in greater detail below in conjunction with FIG. 3, the serial interface is enabled for data transfer when the serial data enable pin (SDEN) is high. SDEN is asserted high prior to any transmission and it should remain high until the completion of the transfer. At the end of each transfer SDEN should be brought low. When SDEN is high, the data presented to the serial data pin (SDATA) will be latched on each rising edge of the serial clock pin (SCLK). Rising edges of SCLK should only occur when the desired bit of address or data is being presented on the serial data line SDEN. The data is latched into an internal register.

Other pins for electrical communication with the HDD 200 are labeled WAKEUP (for receiving a signal indicating the end of a low power mode), Bit-W (for writing a bit of data), and Bit-R (for reading a bit of data). Other connections may be included as well.

In some embodiments the MC 204 and the SoC 206 are each manufactured on a separate integrated circuit. The MC 204 includes linear circuits such as the regulators 226, 228, 230, 232 and the spindle drivers 218. In the embodiment of FIG. 2, a supply voltage of 2.5 to 5.0 volts is supplied to the MC 204. The SoC 206 includes digital logic circuits such as the SoC core 242 and memory 244, 246. In the embodiment of FIG. 2, a supply voltage up to 3.6 volts is supplied to the SoC 206. The integrated circuit including the MC 204 and the integrated circuit including the SoC 206 are mounted on a common printed wiring board and electrically interconnected. In other embodiments, where technology and economics permit, the MC 204 and the SoC 206 may be manufactured in a common integrated circuit.

The HDD 200 is adapted to enter a low power mode in which active circuits are deactivated. Deactivating circuits reduces or eliminates power consumption in those circuits and reduces overall current drain in the HDD 200. The HDD 200 is further adapted to remain ready for communication over the USB interface 250 so that the process of reactivating powered down circuits does not produce a latency or wait time during which a host device is waiting for a response.

In operation, a command is issued to enter the low power mode. The SIF & IO circuit 260 may be used for this purpose. After receipt of low power mode entry command, the signal on the SDEN line is asserted (low) and low power mode is entered. In the low power mode, as much circuitry as possible is deactivated. In the MC 204, the spindle core 214 and spindle drivers 216, the VCM coil 218, the DAC 220, −2 volt regulator 228 and the 3 volt regulator 226 will be disabled, along with other components. Similarly, the SoC 206 has been partitioned to enhance this process. Portions which are not needed may be shut down to reduce or eliminate power consumption.

In order to maintain the ability to detect access communications to the HDD 200, the USB interface 250 remains active or energized. In this manner, the USB interface 250 is active to receive any data read or data write commands over a USB connection to a host computer or device, such as a portable laptop computer, MP3 player, etc.

To be active, the USB interface 250 maintains access to its USB identity and USB configuration information. If this information is lost (as by removing power from the register where the information is stored), the information must be provided anew to the USB interface 250 by the host computer or device. This process takes time and increases the latency or wait time for the HDD 200 to response. In order to maintain the USB identity and configuration information, data defining this information is stored in the SoC core 242. When the configuration information is requested by the USB interface 250, it can be retrieved from register storage in the SoC core 242.

To keep the USB interface 250 and the SoC core 242 energized when the HDD 200 enters the low power mode, special provisions are made to regulator circuits of the HDD 200. For example, the 3 volt regulator 232 is maintained to provide operating power to the USB interface 250. In the exemplary embodiment, the 3 volt regulator 232 is a conventional, simple bandgap regulator designed to operate at relatively low power drain. Further, the 3 volt regulator 232 is only in communication with the USB interface 250 and only provides the small operating current for use by the USB interface 250. No other circuits of the HDD 200 communicate with the 3 volt regulator 232 in the low power mode.

To keep the SoC core 242 powered during the low power mode, the 1.2 volt regulator 230 is switched to a linear mode of operation from its switching mode of operation. In the switching mode, the 1.2 volt regulator 230 provides a well regulated signal which is relatively insensitive to variations of supply voltage and temperature. This well regulated signal is used for active mode operation of the circuits of the MC 204 and the SoC 206. However, in low power mode, these well regulated power supplies need not be controlled with very tight tolerances. In low power mode, the only requirement is a voltage to power the SoC core 242 and provide the minimal operating current (such as 20 pA) required by the SoC core 242. In the linear mode, the output voltage of the 1.2 volt regulator 230 is approximately 0.8 to 1.4 volts, depending on the load current. When the 1.2 volt regulator 230 is switched to the linear mode, its current draw and power consumption decreases substantially.

Consequently, a HDD 200 with a low power mode standby current of less than 500 µA is provided. This is substantially less than other devices, which have standby current of approximately 50 mA, or 100 times higher. Moreover, there is no access delay penalty to the low power mode. Since the USB interface 250 remains energized and since the SoC 242 core retains the configuration data for the USB interface 250, the HDD 200 is ready to respond to an access request with minimal delay.

Figure 3:
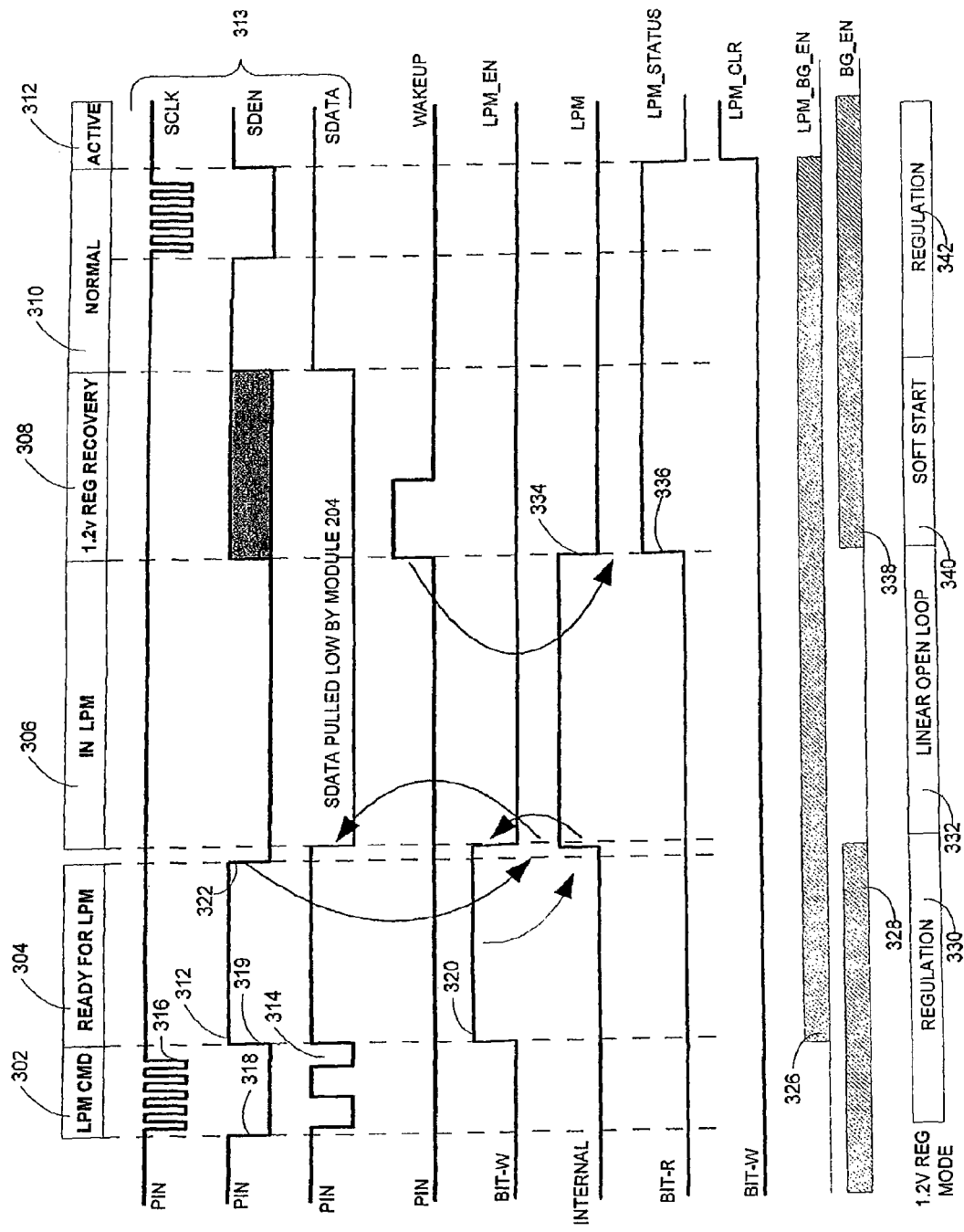
FIG. 3 is a timing diagram illustrating operation of the hard disk drive of FIG. 2.

FIG. 3 shows a timing diagram illustrating entry to and exit from the low power mode. Stages of operation are described across the top of FIG. 3. During a time period 302, the command to enter the low power mode is issued, for example by the host processor 120. During the time period 304, the command is latched and the HDD 200 is awaiting the final step to enter low power mode, when the signal on the serial data enable SDEN line is pulled low. During time period 306, the HDD 200 is in the low power mode. During the time period 308, a wakeup command is received from the host processor 120 and the HDD 200 is in a regulator recovery period. During time period 310, the HDD 200 returns to normal operation awaiting and receiving commands on the three conductor bus 313 which includes signal paths SCLK, SDEN, SDATA. Finally, during time period 312, the HDD 200 is in normal, active mode.

During the time period 302, the serial data is provided to the SDATA line 314, the enable line SDEN 318 is pulled low and the serial data clock line SCLK 316 is asserted to clock the command on the three conductor bus 313. On the rising edge 319 of the enable line SDEN, the HDD 200 pulls the signal on the Bit-W line 320 high. At this point, the HDD is ready to enter the low power mode. When the enable line SDEN 318 is asserted low at falling edge 322, low power mode is entered.

At entry to the low power mode, all components which can be powered down are powered down. This generally includes all circuits of the motor controller 204 and the system on a chip 206 with the exception of the USB interface 250 and the SoC core 242, and regulators 226, 228, 230, 232 used to sufficiently power the USB interface 250 and the SoC core 242. As illustrated in FIG. 3, the high level on the Bit-W line 320 and the falling edge 322 on the SDEN line 318 causes an internal node to go high indicating and controlling the low power mode internally. The rising edge on this internal node causes the HDD 200 to pull the signal on the SDATA line 314 low, providing an external indication that the HDD is in the low power mode.

The activity of relevant voltage regulator circuits is also illustrated in FIG. 3, at the bottom. At the time of the rising edge on the Bit-W line 320, when the HDD 200 becomes ready for low power mode, the dedicated bandgap regulator (regulator 232 in FIG. 2) becomes active to provide operating power to the USB interface 250, as evidenced by trace 326 in FIG. 3. The signal produced by this regulator may be switched to the USB interface 250 by suitable logic or other means so that the signal is provided only during the low power mode while conventional power is provided during active mode.

Conversely, when the low power mode is entered at the falling edge 322 of the signal on SDEN, the bandgap regulator (such as regulator 226 in FIG. 2) is de-energized, as evidenced by trace 328 in FIG. 3. Still further, the 1.2 volt regulator (regulator 230 in FIG. 2) moves from switching mode, which is a relatively high power mode, as evidenced by trace 330, to a linear mode which is a relatively low power mode, as evidenced by trace 332. The output of this regulator is sufficient to power the SoC core 242 of the HDD 200 which stores the USB configuration information for the HDD 200.

End of the low power mode is indicated by the rising edge on the line labeled WAKEUP. Alternatively, this line can be electrically shorted to the SDEN pin so that when serial data enable is pulled high, the low power mode is exited. This transition caused a falling edge 334 on the internal node and prompts the HDD 200 to assert the signal on the Bit-R pin 336 to a high value. This indicates externally that the HDD is exiting the low power mode. During the regulator recovery time period 308, the bandgap regulator (such as regulator 226 in FIG. 2) is re-energized, as evidenced by trace 338 in FIG. 3. Similarly, during this time period, the 1.2 volt regulator (regulator 230 in FIG. 2) moves from the linear mode to the switching mode, as evidenced by trace 340 in FIG. 3. During the time period 310, this regulator resumes normal switching mode operation, trace 342. Subsequently, during time period 312, the HDD 200 is ready for normal operation using the three conductor bus 313.

Figure 4A:
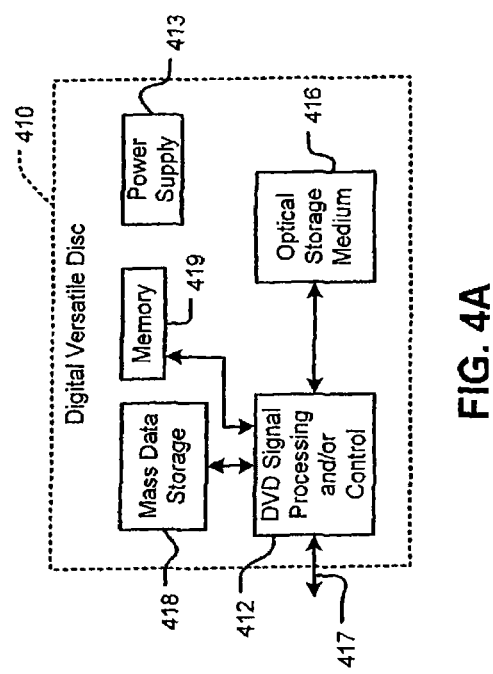
FIG. 4A is a functional block diagram of a digital versatile disk (DVD)

Referring now to FIGS. 4A-4E, various exemplary implementations of the present invention are shown. Referring now to FIG. 4A, the present invention can be implemented in a digital versatile disc (DVD) drive 410. The DVD may incorporate a hard disk drive including the features and functions described above in connection with FIGS. 2 and 3. The present invention may implement and/or be implemented in either or both signal processing and/or control circuits, which are generally identified in FIG. 4A at 412, mass data storage of the DVD drive 410 and/or a power supply 413. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 2. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Referring now to FIG. 4B, the present invention can be implemented in a high definition television (HDTV) 420. The HDTV may incorporate a hard disk drive including the features and functions described above in connection with FIGS. 2 and 3. The present invention may implement and/or be implemented in either or both signal processing and/or control circuits, a WLAN interface, mass data storage of the HDTV 420 and/or a power supply 423. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 2 and/or at least one DVD may have the configuration shown in FIG. 4A. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 4C, the present invention may implement and/or be implemented in a control system of a vehicle 430, a WLAN interface, mass data storage of the vehicle control system and/or a power supply 433. The vehicle may incorporate a hard disk drive including the features and functions described above in connection with FIGS. 2 and 3. In some implementations, the present invention implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. At least one HDD may have the configuration shown in FIG. 2 and/or at least one DVD may have the configuration shown in FIG. 4A. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 4D:
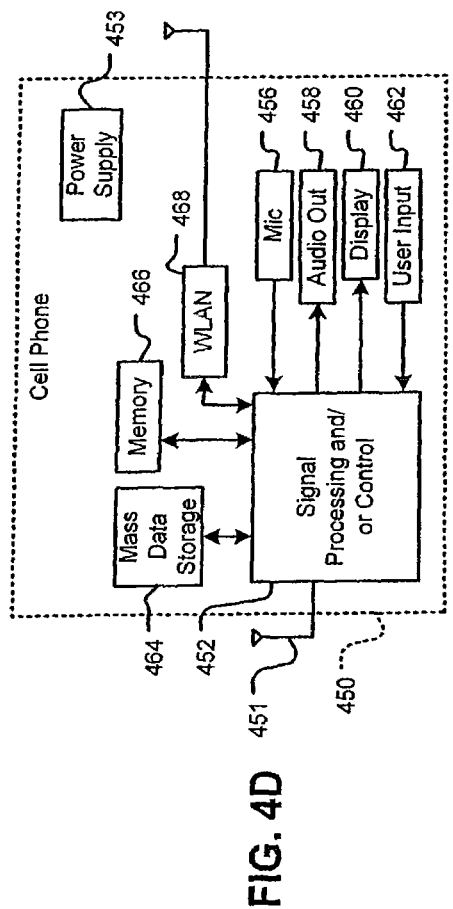
FIG. 4D is a functional block diagram of a cellular phone.

Referring now to FIG. 4D, the present invention can be implemented in a cellular phone 450 that may include a cellular antenna 451. The cellular phone or cellular antenna may incorporate a hard disk drive including the features and functions described above in connection with FIGS. 2 and 3. The present invention may implement and/or be implemented in either or both signal processing and/or control circuits, which are generally identified in FIG. 4D at 452, a WLAN interface, mass data storage of the cellular phone 450 and/or a power supply 453. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. At least one HDD may have the configuration shown in FIG. 2 and/or at least one DVD may have the configuration shown in FIG. 4A. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 4E:
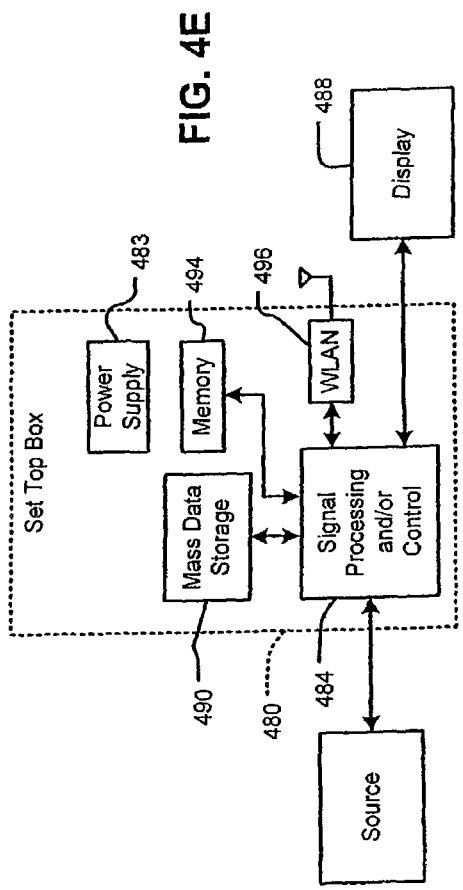
FIG. 4E is a functional block diagram of a set top box.

Referring now to FIG. 4E, the present invention can be implemented in a set top box 480. The set top box may incorporate a hard disk drive including the features and functions described above in connection with FIGS. 2 and 3. The present invention may implement and/or be implemented in either or both signal processing and/or control circuits, which are generally identified in FIG. 4E at 484, a WLAN interface, mass data storage of the set top box 480 and/or a power supply 483. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. At least one HDD may have the configuration shown in FIG. 2 and/or at least one DVD may have the configuration shown in FIG. 4A. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 4F:
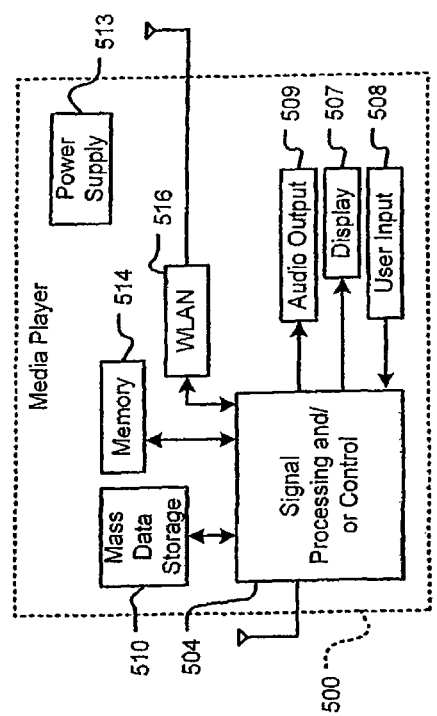
FIG. 4F is a functional block diagram of a media player.

Referring now to FIG. 4F, the present invention can be implemented in a media player 500. The media player may incorporate a hard disk drive including the features and functions described above in connection with FIGS. 2 and 3. The present invention may implement and/or be implemented in either or both signal processing and/or control circuits, which are generally identified in FIG. 4F at 504, a WLAN interface, mass data storage of the media player 500 and/or a power supply 503. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 2 and/or at least one DVD may have the configuration shown in FIG. 4A. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

It is to be understood that the method and apparatus as disclosed herein may be used in conjunction with other types of storage systems as well. Further, the data communication technique and apparatus may be extended to other communication devices.

It is intended that the foregoing detailed description be understood as an illustration of selected forms that the invention can take and not as a definition of the invention. It is only the following claims, including all equivalents, that are intended to define the scope of this invention.

What is claimed is:

1. A storage device configured to operate in an active mode and a low power mode, the storage device comprising:
   an interface configured to communicate with an external device;
   a core in communication with the interface, the core configured to maintain configuration information for the interface when the storage device operates in the low power mode; and
   a module configured to output a first signal to the core and a second signal to the interface when the storage device operates in the low power mode,
   wherein, during the low power mode, the core is configured to maintain the configuration information in response to receipt of the first signal and the interface is configured to be active in response to receipt of the second signal.

2. The storage device of claim 1, wherein the configuration information comprises at least one of a device identifier and a configuration for the storage device.

3. The storage device of claim 1, wherein the module is configured to operate in a linear mode to generate the first signal when the storage device operates in the low power mode.

4. The storage device of claim 3, wherein the module is further configured to:
   operate in a switching mode to generate the first signal when the storage device operates in the active mode; and
   switch from the switching mode to the linear mode when the storage device switches from the active mode to the low power mode.

5. The storage device of claim 1, wherein the module comprises a plurality of regulators, and wherein, when the storage device switches from the active mode to the low power mode, all of the plurality of regulators are configured to power down except a first regulator configured to generate the first signal and a second regulator configured to generate the second signal.

6. The storage device of claim 1, wherein the core comprises one or more registers to maintain the configuration information for the interface when the core is in receipt of the first signal.

7. The storage device of claim 1, wherein the interface comprises a first interface, the storage device further comprising a second interface that receives a command instructing the storage device to switch from the active mode to the lower power mode.

8. The storage device of claim 1, wherein the module comprises a bandgap regulator configured to generate the first signal.

9. The storage device of claim 1, wherein the module comprises a regulator configured to communicate only with the interface when the storage device operates in the low power mode.

10. The storage device of claim 1, wherein all circuit components of the storage device are powered down during the low power mode except the core, the interface, and the module.

11. The storage device of claim 10, wherein the circuit components powered when the storage device operates in the low power mode comprise a motor controller having a spindle core circuit and a voice coil motor circuit.

12. The storage device of claim 1, wherein the storage device has a standby current of less than about 500 microamps in the low power mode.

13. The storage device of claim 1, wherein the interface comprises a Universal Serial Bus (USB) interface.

14. A method of operating a storage device in an active mode and a low power mode, the method comprising:
when operating the storage device in the low power mode:
outputting, with a module, a first signal to a core of the storage device and a second signal to an interface of the storage device;
maintaining, with the core, configuration information for the interface in response to receiving the first signal output by the module; and
operating the interface in an active state to communicate with an external device in response to receiving the second signal output by the module.

15. The method of claim 14, wherein the configuration information comprises at least one of a device identifier and a configuration for the storage device.

16. The method of claim 14, further comprising:
operating the module in a linear mode to generate the first signal when the storage device is operating in the low power mode.

17. The method of claim 16, further comprising:
operating the module in a switching mode to generate the first signal when the storage device is operating in the active mode; and
switching the module from the switching mode to the linear mode when the storage device switches from operating in the active mode to operating in the low power mode.

18. The method of claim 14, wherein the module comprises a plurality of regulators, the method further comprising:
when switching the storage device from operating in the active mode to the low power mode:
generating the first signal with a first regulator of the plurality of regulators;
generating the second signal with a second regulator of the plurality of regulators; and
powering down the plurality of regulators except the first regulator and the second regulator.

19. The method of claim 14, wherein outputting the second signal to the interface comprises outputting, with a regulator of the module, the second signal to the interface without the regulator communicating with any other circuit component of the storage device.

20. The method of claim 14, further comprising:
when the storage device is operating in the low power mode,
powering down a motor controller having a spindle core circuit and a voice coil motor circuit of the storage device.

* * * * *